(12) United States Patent
Snider

(10) Patent No.: US 6,487,219 B1
(45) Date of Patent: Nov. 26, 2002

(54) MULTI-BAND RECEIVER HAVING MULTI-SLOT CAPABILITY

(75) Inventor: James R. Snider, Irvine, CA (US)

(73) Assignee: Skyworks Solutions, Inc., Newport Beach, CA (US)

( * ) Notice: Subject to any disclaimer, the term of this patent is extended or adjusted under 35 U.S.C. 154(b) by 0 days.

(21) Appl. No.: 09/392,355

(22) Filed: Sep. 8, 1999

(51) Int. Cl.[7] .............................. H04J 4/00; H04B 1/38; H04B 1/26; H04B 1/16
(52) U.S. Cl. ....................... 370/478; 455/552; 455/315; 455/189.1; 455/190.1; 455/207; 455/131; 370/480
(58) Field of Search ................................. 370/478, 480, 370/310, 343, 345, 442; 375/344; 455/552, 315, 189.1, 190.1, 207, 131, 553, 150.1, 161.1, 164.1, 164.2, 165.1, 168.1, 179.1, 183.1, 183.2, 192.1, 192.2, 208, 209, 313, 314

(56) References Cited

U.S. PATENT DOCUMENTS 6,201,952 B1 * 3/2001 Shimizu et al. ............. 455/315
6,308,050 B1 * 10/2001 Eklof ......................... 455/315

* cited by examiner

Primary Examiner—William Trost
Assistant Examiner—Rafael Perez-Gutierrez
(74) Attorney, Agent, or Firm—Procopio, Cory, Hargreaves & Savitch, LLP

(57) ABSTRACT

A dual-band receiver for a wireless communication device having multi-slot capability. A first oscillator generates a relatively high frequency traffic LO signal. A second oscillator generates a first relatively low frequency signal, and a third oscillator generates a fixed low frequency signal. A first mixer mixes the first and fixed low frequency signals to produce a relatively high frequency monitor LO signal. A switch selects the traffic LO signal when the receiver is in a traffic slot and the monitor LO signal when the receiver is in a monitor slot. The selected LO signal is provided to a second mixer along with the received signal to produce a first IF signal. A third mixer mixes the first IF signal and the fixed frequency signal to produce an output signal.

18 Claims, 8 Drawing Sheets

MULTI-BAND RECEIVER HAVING MULTI-SLOT CAPABILITY

FIELD OF THE INVENTION

The present invention relates generally to radio or wireless communications and, more particularly, relates to a multi-band receiver having multi-slot capability.

BACKGROUND OF THE INVENTION

Wireless or radio frequency (RF) communication systems are an integral component of the ongoing technology revolution and are evolving at an exponential rate. Many wireless communication systems are configured as "cellular" systems, in which the geographic area to be covered by the cellular system is divided into a plurality of "cells". Mobile communication devices or stations (e.g., wireless telephones, pagers, personal communications devices and the like) in the coverage area of a cell communicate with a fixed base station or transmitter within the cell. Low power base stations are utilized, so that frequencies used in one cell can be re-used in cells that are sufficiently distant to avoid interference. Hence, a cellular telephone user, whether mired in traffic gridlock or attending a meeting, can transmit and receive phone calls so long as the user is within a cell served by a base station.

The communication format used in most wireless communications systems is a high-frequency carrier waveform modulated by low frequency or "baseband" audio or data signals. Mobile stations (wireless handsets, for example) within a wireless communication system typically have a transmitter that "modulates" baseband signals (e.g., speech detected by the handset microphone) onto the carrier waveform. Amplitude modulation (AM) and frequency modulation (FM) techniques, for example, are well known to those of ordinary skill in the art. Mobile stations also typically have a receiver that "demodulates" the carrier waveform to extract the baseband signal. The carrier waveforms required for modulation and demodulation are high frequency, periodic waveforms and are typically generated by oscillators within the transmitter and receiver.

The available frequency spectrum is distributed among the cellular base stations according to a frequency plan. In a GSM network, for example, the transmission band covers 880–915 MHz and the receiving band covers 925–960 MHz (see detailed description herein and FIGS. 2–3). The transmit and receive bands, in turn, are partitioned into 200 kHz frequency channels. Many of these channels, obviously, are reserved for the actual transmission and reception of speech or data. These channels are known as "traffic" channels. Other channels are reserved for control and monitoring operations. These channels are known as "broadcast" channels. Information may be exchanged in slots tuned to broadcast channels about, for example, whether a hand over to a neighboring cell should be performed, or which traffic channel the mobile station should tune to next.

GSM networks use a time-division multiple access (TDMA) architecture. Each channel (within the transmit and receive bands) is available to multiple users, but at different times. In one TDMA implementation, each channel is subdivided in time into eight time slots. Hence, each frequency channel will be available to eight different transceivers or users at different times. Each time slot has a duration of approximately 0.577 ms (577 μs), and eight time slots form a TDMA "frame", having a duration of 4.615 ms.

An example TDMA frame 80 having eight time slots 0–7 is illustrated in FIG. 1a. Frame 80 represents the channel/time assignments for one wireless device or mobile station. Slot zero is a traffic slot in which data is transmitted over a traffic channel, and slot three is also a traffic slot in which data is received over a traffic channel. Time slot six has been reserved as a monitor slot. In monitor slot six, the wireless device may monitor a broadcast channel for operational/control data, an adjacent cell for power information, or any other frequency on which control or operational data is exchanged.

Since the device must be tuned to different frequency channels in the traffic and monitor slots, a certain amount of resting time is required to permit retuning and settling of the oscillator. The unused or "rest" time slots (slots 1, 2, 4 and 5 in frame 80, for example) between traffic and monitor slots are used to retune and settle the local oscillator to the next frequency channel. The tuning and settling time required in a conventional GSM receiver, in order to guarantee reprogramming of the oscillator over the frequency range extremes and locking within 100 Hz, is in the range of 840 ms (about 1.5 slots). In a frame structure such as frame 80, where the traffic and monitor slots are single and spaced apart, ample rest slots are available to accommodate this requirement.

One of the current development trends in GSM systems is "multi-slot" reception and transmission. In multi-slot operation, a mobile station transmits and/or receives in multiple time slots within each TDMA frame. This is in contrast to the configuration of frame 80, in which there is only one receive and one transmit slot per frame. A multi-slot framework, by providing more receive and/or transmit slots per frame, drastically increases data transmission rates. Increased data transmission rates are particularly important for data-intensive applications such as wireless Internet access.

The present invention is directed to a mobile station having multi-slot reception capability. A TDMA frame 85 having multiple traffic and monitor slots within the receive band is shown in FIG. 1b. TDMA frame 85 has one transmit traffic slot zero, two receive traffic slots two and three, and three monitor slots four through six. Many other multiple slot assignments are of course possible. Frame 85 is just one possibility that is presented for exemplary purposes only.

Use of multiple slots is problematic in conventional receivers as there is often insufficient time to retune and settle the local oscillator when switching frequencies between traffic and monitor slots. In FIG. 1b, for example, there is only one slot available to switch from the transmit traffic channel to the receive traffic channel, and no slots are available to make the switch from the receive traffic channel to the receive monitor channel. For the latter frequency change, where adjacent slots are assigned to different frequency channels, the required oscillation frequency change must be effected virtually simultaneously.

Various attempts have been made to decrease the frequency channel switching time in order to accommodate multi-slot reception. One approach has been to increase the corner frequency of the receiver's PLL loop filter in order to decrease the lock time of the PLL. This approach, however, decreases the utility of the filter and makes it difficult to meet spurious performance requirements. Another approach is to use fractional-N type architectures, which permit use of higher PLL reference and corner frequencies. Fractional-N architectures, however, still pass high levels of phase noise and, though they provide quicker lock times, they do not provide the speed that is necessary for instantaneous switching. Another approach is to simply use separate high frequency oscillators in the receiver for the traffic and monitor channels. This approach, though providing the necessary speed, is too costly to make its implementation feasible.

SUMMARY OF THE INVENTION

The present invention provides a multi-band receiver for a wireless communication device that has enhanced multi-slot reception capability. The inventive receiver provides virtually instantaneous frequency channel switching by mixing a pre-existing oscillation resource with an added low frequency oscillator. The added oscillator and mixer elements are inexpensive, can be integrated with the pre-existing components on one IC, and contribute a minimal amount of current drain to the receiver.

In one embodiment of the present invention, a receiver is provided. An antenna receives an Rx signal, and a first oscillator generates a relatively high frequency traffic LO signal. Second and third oscillators generate first and second relatively low frequency signals. A first mixer mixes the first and second relatively low frequency signals to produce a relatively high frequency monitor LO signal. A second mixer mixes either the traffic or monitor LO signal with the Rx signal to produce a first IF signal. A third mixer mixes the first IF signal and the second relatively low frequency signal to produce an output signal.

In one implementation, the receiver is a dual band receiver and the Rx signal is within a 925–960 MHz bandwidth for GSM operation or an 1805–1880 MHz for DCS operation. The traffic LO signal is within a 1325–1380 MHz (GSM) or 1405–1480 MHz (DCS) bandwidth. The first relatively low frequency signal is within a 554.2–589.2 MHz (GSM) or a 634.2–709.2 MHz (DCS) bandwidth, and the second relatively low frequency signal has a fixed frequency of 770.8 MHz. In a further implementation, a switch is provided for switching between the traffic and monitor LO signals.

Another embodiment of the present invention provides a wireless communication device. The device includes a microphone for capturing audio acoustic signals and converting the acoustic signals into electric signals, and a speaker for converting electric signals into audio acoustic signals. An antenna is provided for wireless transmission and reception of acoustic or data signals, and a transmitter is provided for transmitting acoustic or data signals over the antenna. A processor directs the overall operation of the device.

The communication device also includes a receiver. The receiver has a high frequency oscillator that generates a traffic signal and two low frequency oscillators. A first mixer mixes the signals from the two low frequency oscillators to generate a monitor signal. A second mixer mixes a received signal from the antenna with either the traffic or monitor signal from a switch to generate an IF signal. A third mixer mixes the IF signal with a signal from one of the low frequency oscillators to generate an output signal. In one implementation, the IF signal is mixed with a fixed low frequency signal.

The present invention also provides a method for wireless, multi-slot signal reception. The method includes the steps of:

generating a relatively high frequency traffic LO signal;
generating a first relatively low frequency signal;
generating a second relatively low frequency signal;
mixing the first and second relatively low frequency signals to generate a relatively high frequency monitor LO signal;

receiving an Rx signal in a traffic slot or a monitor slot of a TDMA frame;

mixing the Rx signal with the traffic LO signal if the Rx signal is received in the traffic slot to generate a first IF signal;

mixing the Rx signal with the monitor LO signal if the Rx signal is received in the monitor slot to generate the first IF signal; and mixing the first IF signal with the one of the low frequency signals to generate an output signal.

Objects and advantages of the present invention include any of the foregoing, singly or in combination. Further objects and advantages will be apparent to those of ordinary skill in the art, or will be set forth in the following disclosure.

BRIEF DESCRIPTION OF THE DRAWINGS

The present invention is described with reference to the accompanying drawings. In the drawings, like reference numbers indicate identical or functionally similar elements.

DETAILED DESCRIPTION OF PREFERRED EMBODIMENTS

1. Example Wireless Communication Network

Figure 1A:
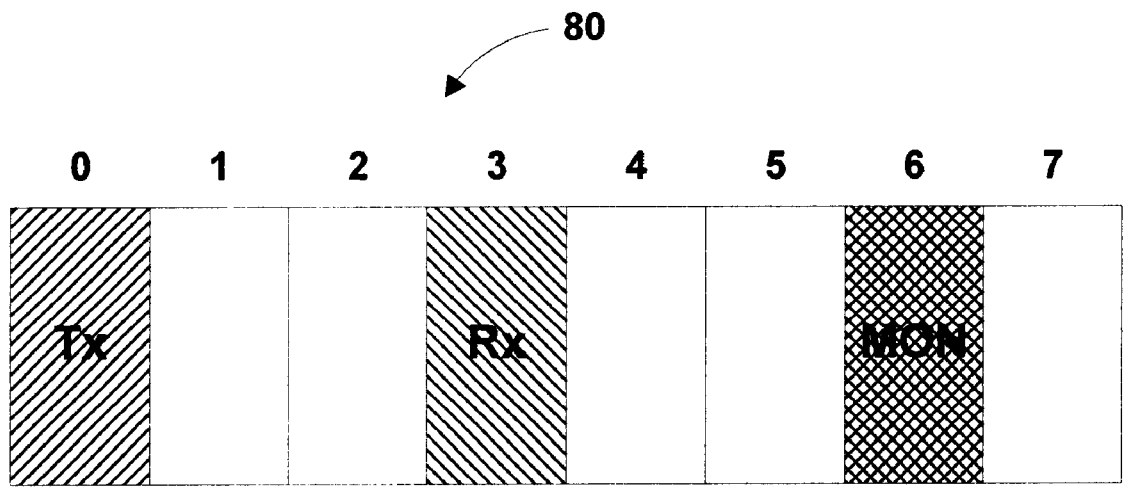
FIG. 1a illustrates the format of a conventional TDMA frame.

Before describing the invention in detail, it is useful to describe an example environment in which the invention can be implemented. One such example is a wireless communication network. For illustrative purposes, the present invention will be described in the context of a wireless communication network adhering to the GSM standard. It should be understood, however, that the present invention could also be implemented in the context of other wireless communication networks.

One of the most common forms of wireless communications networks, the mobile cellular system, was originally developed as an analog system. After their introduction for commercial use in the early 1980s, mobile cellular systems began to experience rapid and uncoordinated growth. In Europe, for example, individual countries developed their own systems. Generally, the systems of individual countries were incompatible, which constricted mobile communications within national boundaries and restricted the market for mobile equipment developed for a particular country's system.

In 1982, in order to address this growing problem, the Conference of European Posts and Telecommunications (CEPT) formed the Groupe Speciale Mobile (GSM) to study and develop a set of common standards for a future pan-European cellular network. It was recommended that two blocks of frequencies in the 900 MHz range be set aside for the system. The initial goals for the new system included international roaming ability, good subjective voice quality, compatibility with other systems such as the Integrated Services Digital Network (ISDN), spectral efficiency, low handset and base station costs, and the ability to support new services and a high volume of users.

One of the initial, major decisions in the development of the GSM standard was adoption of a digital, rather than an analog, system. As mentioned above, analog systems were experiencing rapid growth and the increasing demand was straining the capacity of the available frequency bands. Digital systems offer improved spectral efficiency and are more cost efficient. The quality of digital transmission is also superior to that of analog transmission. Background sounds such as hissing and static and degrading effects such as fadeout and cross talk are largely eliminated in digital systems. Security features such as encryption are more easily implemented in a digital system. Compatibility with the ISDN is more easily achieved with a digital system. Finally, a digital approach permits the use of Very Large Scale Integration (VLSI), thereby facilitating the development of cheaper and smaller mobile handsets.

In 1989, the European Telecommunications Standards Institute (ETSI) took over responsibility for the GSM standards. In 1990, phase I of the standard was published and the first commercial services employing the GSM standard were launched in 1991. It was also renamed in 1991 as the Global System for Mobile Communications (still GSM). After its early introduction in Europe, the standard was elevated to a global stage in 1992 when introduced in Australia. Since then, GSM has become the most widely adopted and fastest growing digital cellular standard, and is positioned to become the world's dominant cellular standard. With (currently) 324 GSM networks in operation in 129 countries, GSM provides almost complete global coverage. As of January 1999, according to the GSM Memorandum of Understanding Association, GSM accounted for more than 120 million subscribers. Market research firms estimate that by 2001, there will be more than 250 million GSM subscribers worldwide. At that time, GSM will account for almost 60% of the global cellular subscriber base, with yearly shipments exceeding 100 million phones.

Figure 2A:
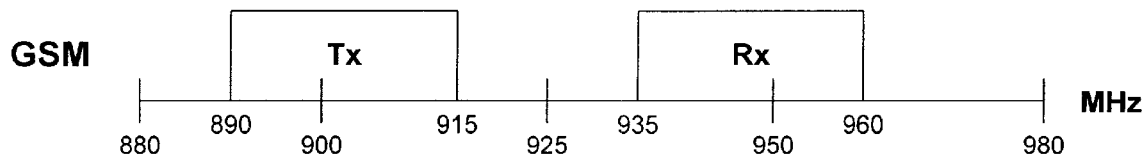
FIG. 2a illustrates the transmit and receive frequency bands under the GSM standard.
Figure 2B:
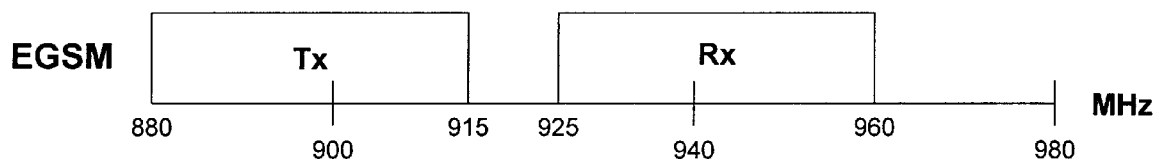
FIG. 2b illustrates the transmit and receive frequency bands under the EGSM standard.

Two frequency bands of 25 MHz were allocated for GSM use. As illustrated in FIG. 2a, the 890–915 MHz band is reserved for transmission or "uplink" (mobile station to base station), and the 935–960 MHz band is reserved for reception or "downlink" (base station to mobile station). An extra ten MHz of bandwidth was later added to each frequency band. The standard incorporating this extra bandwidth (two 35 MHz bands) is known as Extended GSM (EGSM). In EGSM, the transmission band covers 880–915 MHz and the receiving band covers 925–960 MHz (FIG. 2b). The terms GSM and EGSM are used interchangeably, with GSM sometimes used in reference to the extended bandwidth portions (880–890 MHz and 925–935 MHz). Sometimes, the originally specified 890–915 MHz and 935–960 MHz bands are designated Primary GSM (PGSM). In this specification, GSM is used in reference to the extended bandwidth (35 MHz) standard.

Figure 2C:
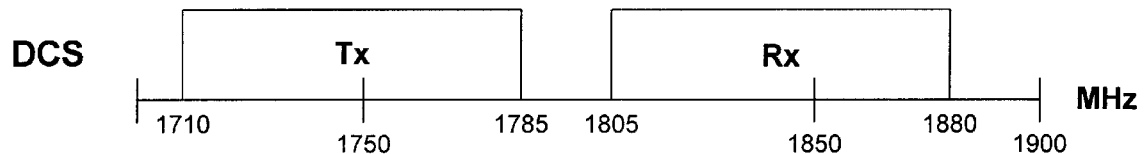
FIG. 2c illustrates the transmit and receive frequency bands under the GSM 1800 ("DCS") standard.
Figure 2D:
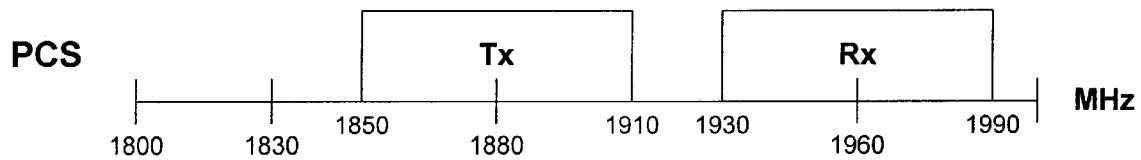
FIG. 2d illustrates the transmit and receive frequency bands under the GSM 1900 ("PCS") standard.

Due to the expected widespread use of GSM, capacity problems in the 900 MHz frequency bands were anticipated and addressed. ETSI had already defined an 1800 MHz variant (DCS or GSM 1800) in the first release of the GSM standard in 1989. In DCS, the transmission band covers 1710–1785 MHz and the receiving band covers 1805–1880 MHz (FIG. 2c). In the United States, the Federal Communications Commission (FCC) auctioned large blocks of spectrum in the 1900 MHz band, aiming to introduce digital wireless networks to the country in the form of a mass market Personal Communication Service (PCS). The GSM service in the US is known as PCS or GSM 1900. In PCS, the transmission band covers 1850–1910 MHz and the receiving band covers 1930–1990 MHz (FIG. 2d).

Regardless of which GSM standard is used, once a mobile station is assigned a channel, a fixed frequency relation is maintained between the transmit and receive traffic channels. In GSM (900 MHz), this fixed frequency relation is 45 MHz. If, for example, a mobile station is assigned a transmit traffic channel at 895.2 MHz, its receive traffic channel will always be at 940.2 MHz. This also holds true for DCS and PCS; the frequency relation is just different. In DCS, the receive channel is always 95 MHz higher than the transmit channel and, in PCS, the receive channel is 80 MHz higher than the transmit channel.

Figure 3:
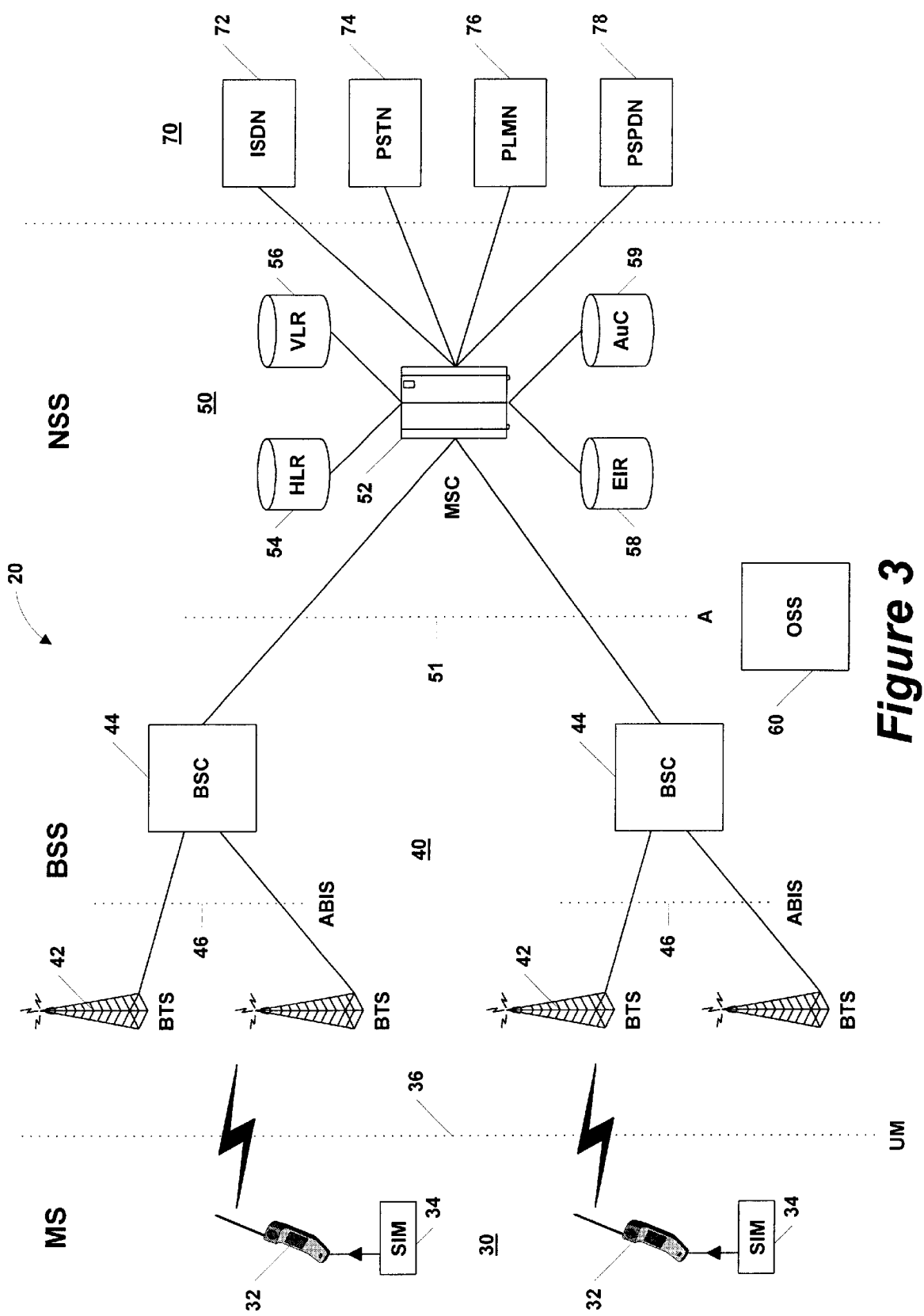
FIG. 3 is a block diagram of an exemplary GSM network.

The architecture of one implementation of a GSM network 20 is depicted in block form in FIG. 3. GSM network 20 is divided into four interconnected components or subsystems: a Mobile Station (MS) 30, a Base Station Subsystem (BSS) 40, a Network Switching Subsystem (NSS) 50 and an Operation Support Subsystem (OSS) 60. Generally, MS 30 is the mobile equipment or phone carried by the user; BSS 40 interfaces with multiple MSs 30 and manages the radio transmission paths between the MSs and NSS 50; NSS 50 manages system switching functions and facilitates communications with other networks such as the PSTN and the ISDN; and OSS 60 facilitates operation and maintenance of the GSM network.

Mobile Station 30 comprises Mobile Equipment (ME) 32 and Subscriber Identity Module (SIM) 34. ME 32 is typically a digital mobile phone or handset. SIM 34 is a memory device that stores subscriber and handset identification information. It is implemented as a smart card or as a plug-in module and activates service from any GSM phone. Among the information stored on SIM 34 are a unique International Mobile Subscriber Identity (IMSI) that identifies the subscriber to system 20, and an International Mobile Equipment Identity (IMEI) that uniquely identifies the mobile equipment. A user can access the GSM network via any GSM handset or terminal through use of the SIM. Other information, such as a personal identification number (PIN) and billing information, may be stored on SIM 34.

MS 30 communicates with BSS 40 across a standardized "Um" or radio air interface 36. BSS 40 comprises multiple base transceiver stations (BTS) 42 and base station controllers (BSC) 44. A BTS is usually in the center of a cell and consists of one or more radio transceivers with an antenna. It establishes radio links and handles radio communications over the Um interface with mobile stations within the cell. The transmitting power of the BTS defines the size of the cell. Each BSC 44 manages multiple, as many as hundreds of, BTSs 42. BTS-BSC communication is over a standardized "Abis" interface 46, which is specified by GSM to be standardized for all manufacturers. The BSC allocates and manages radio channels and controls handovers of calls between its BTSs.

The BSCs of BSS 40 communicate with network subsystem 50 over a GSM standardized "A" interface 51. The A interface uses an SS7 protocol and allows use of base stations and switching equipment made by different manufacturers. Mobile Switching Center (MSC) 52 is the primary component of NSS 50. MSC 52 manages communications between mobile subscribers and between mobile subscribers and public networks 70. Examples of public networks 70 that MSC 52 may interface with include Integrated Services Digital Network (ISDN) 72, Public Switched Telephone Network (PSTN) 74, Public Land Mobile Network (PLMN) 76 and Packet Switched Public Data Network (PSPDN) 78.

MSC 52 interfaces with four databases to manage communication and switching functions. Home Location Register (HLR) 54 contains details on each subscriber residing within the area served by the MSC, including subscriber identities, services to which they have access, and their current location within the network. Visitor Location Register (VLR) 56 temporarily stores data about roaming subscribers within a coverage area of a particular MSC. Equipment Identity Register (EIR) 58 contains a list of mobile equipment, each of which is identified by an IMEI, which is valid and authorized to use the network. Equipment that has been reported as lost or stolen is stored on a separate list of invalid equipment that allows identification of subscribers attempting to use such equipment. The Authorization Center (AuC) 59 stores authentication and encryption data and parameters that verify a subscriber's identity.

OSS 60 contains one or several Operation Maintenance Centers (OMC) that monitor and maintain the performance of all components of the GSM network. OSS 60 maintains all hardware and network operations, manages charging and billing operations and manages all mobile equipment within the system.

2. Example Wireless Communication Device

The multi-slot receiver of the present invention may be implemented in a wide number of wireless communication devices having various configurations and architectures. Though the present invention is not dependent on a particular device or handset architecture, in order to provide a framework for the present invention, an example wireless handset is described with reference to FIG. 4.

Figure 4:
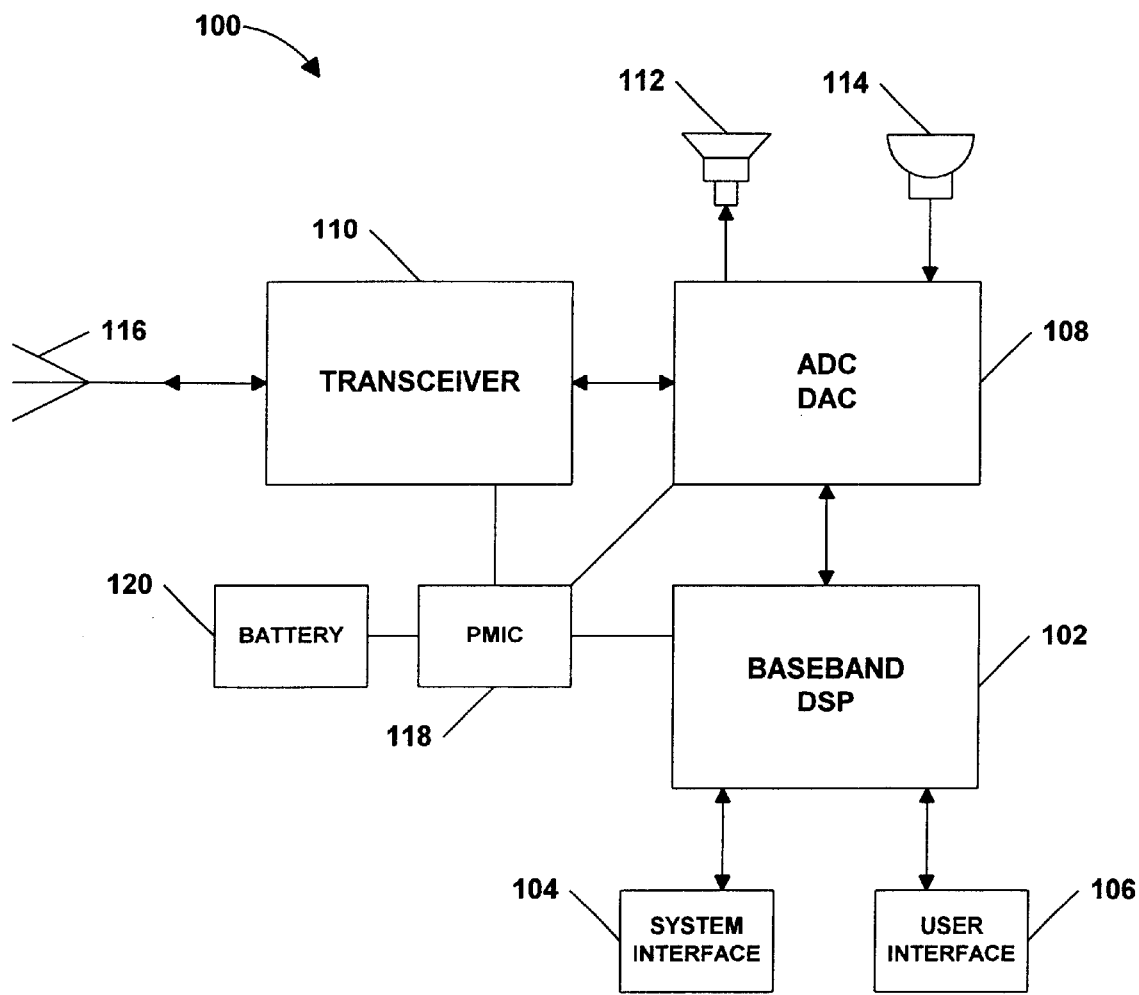
FIG. 4 is a block diagram of a mobile station according to the present invention.

FIG. 4 is a block diagram of one implementation of a wireless communication device 100 incorporating a receiver according to the present invention. Device 100 may be a mobile station or handset, an automobile phone, or any other wireless communication device. For illustrative purposes only, device 100 will be discussed in the context of a wireless handset. Handset 100 may operate as a mobile station within a GSM network, such as a mobile station 30 within a GSM network 20 as illustrated in FIG. 3.

Handset 100 includes a processor 102, such as a baseband digital signal processor (DSP), typically integrated on a single die. Processor 102 directs the overall operation of handset 100 and is ordinarily programmed or coded with a computer program or routine to enable it to carry out its operations. In one implementation, processor 102 is housed in a 128-pin TQFP and, in another implementation, processor 102 is housed in a 160-pin 12×12 mm Chip Array Ball Grid Array (CABGA).

Handset 100 also includes a transceiver 110. Transceiver 110 is configured with a transmitter for transmitting audio and/or data information, and a receiver for receiving audio and/or data information. Processor 102 processes audio data received from antenna 116 and transceiver 110 into an audible acoustic signal for announcement over speaker 112. Processor 102 also processes acoustic data received from microphone 114 into baseband data that is provided to transceiver 110 for transmission over antenna 116.

Processor 102 also manages system and user interface tasks via a system interface 104 and a user interface 106. System interface 104 may include suitable means for managing functions such as GSM network, modem access and other subscriber services. User interface 106 may include suitable means for inputting and displaying information, such as a keypad, display, backlight, volume control and real time clock.

In one implementation, processor 102 interfaces with transceiver 110, speaker 112 and microphone 114 via integrated analog IC 108. IC 108 implements an analog-to-digital converter (ADC), a digital-to-analog converter (DAC) and all signal conversions required to permit interface between processor 102 and transceiver 110, speaker 112 and microphone 114. Typically, the ADC and DAC will be embodied in a CODEC. IC 108 may be implemented in a 100-pin TQFP, a 100-pin 10×10 mm CABGA package or in any other suitable housing.

Microphone 114 is configured to convert acoustic signals, typically those in the audio band, into analog electric signals. The signals captured by microphone 114 are decoded and digitized by the ADC in IC 108 and processed into baseband I and Q signals by processor 102. The digital baseband I and Q signals are converted into an analog signal stream by the DAC in IC 108, and are then modulated and transmitted (via antenna 116) by transceiver 110. Conversely, modulated signals captured by antenna 116 are demodulated and converted into analog baseband I and Q signals by transceiver 110, digitized by IC 108, processed by processor 102, and converted into an analog acoustic signal by IC 108 that is announced by speaker 112.

A power management IC (PMIC) 118 is coupled to a battery 120 and integrates on a single die all power supply related functions required by handset 100.

3. Example Dual Band Receiver

In the descriptions below, "GSM" refers to the extended GSM bands of 880–915 MHz and 925–960 MHz, and "DCS" refers to the bands of 1710–1785 MHz and 1805–1880 MHz. The receivers described are compatible with the standard GSM band (900 MHz) and the DCS band (1800 MHz). It should be appreciated, however, that this is just one of many possible implementations. In particular, it should be appreciated that the oscillators within the receivers could be programmed to accommodate other combinations of GSM bands, more than two GSM bands, or even to support other (non-GSM) standards.

Figure 5:
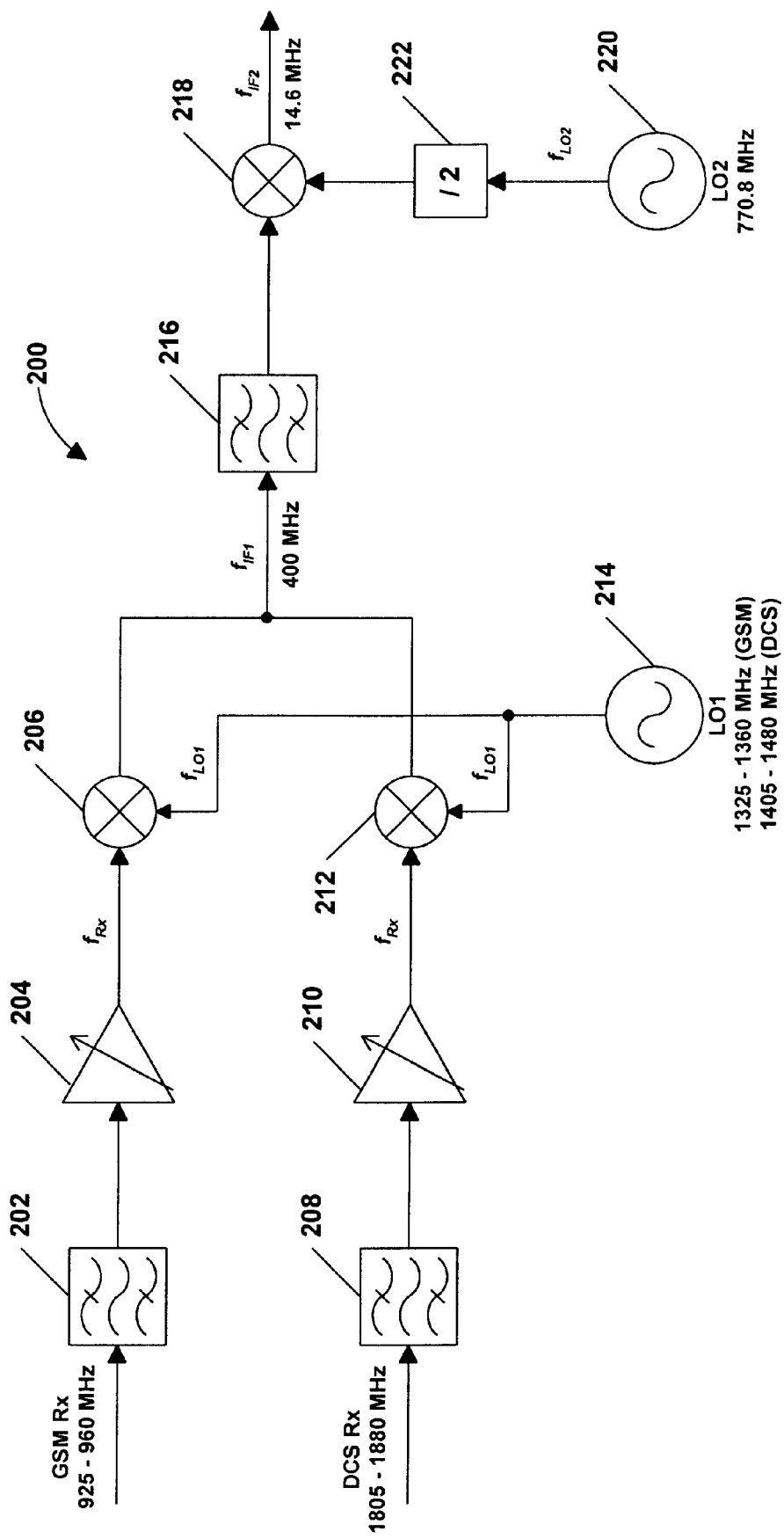
FIG. 5 is a block diagram of a conventional dual band receiver.

FIG. 5 is a block diagram of a dual band receiver 200. Receiver 200 is shown and described in order to provide a backdrop for the later description of receiver 300 embodying the present invention. Receiver 200 is included for exemplary purposes only and without any admission as to its prior art effect. It will ordinarily be embodied in a transceiver of a wireless handset, such as transceiver 110 of FIG. 4.

Receiver 200 receives Rx signals on a frequency channel $f_{Rx}$ from an antenna, such as antenna 116 of FIG. 4. The signals will be received in either a traffic slot or a monitor slot. Initially, the Rx signals are filtered to remove any out-of-band components. Receiver 200 has a dual band configuration. Filter 202 passes only signals within the GSM receive band (925–960 MHz), and filter 208 passes only signals within the DCS receive band (1805–1880 MHz). Low noise amplifiers (LNA) 204 and 210 amplify the Rx signals, which are typically received at a low level. Preferably, LNAs 204 and 210 have a low noise figure to prevent addition of excessive noise to weak Rx signals, and a high intercept point to prevent strong interfering signals from causing interference to the receive signals.

The filtered and amplified Rx signal output by one of LNAs 204 and 210 is supplied to its associated mixer 206 or 212. Mixer 206 or 212 combines the Rx signal with an LO1 signal from local oscillator LO1 (214) to produce an IF1 output signal at a first IF frequency ($f_{IF1}$). The mixing process is analogous to the multiplication of two sine waves in the time domain and produces an IF1 signal that is an exact duplicate of the Rx signal, translated to a lower, intermediate frequency. The LO1 signal frequency $f_{LO1}$ is separated from the Rx signal frequency $f_{Rx}$ by the IF1 signal frequency $f_{IF1}$. In one implementation, $f_{IF1}$ is 400 MHz.

For GSM, the frequency range (bandwidth) of oscillator LO1 is 1325–1380 MHz. Since this range is higher than the Rx signal frequency range, mixer 206 operates in "high side injection" mode and outputs an IF1 signal having a frequency $f_{IF1}=f_{LO1}-f_{Rx}$. For DCS, the frequency range (bandwidth) of oscillator LO1 is 1405–1480 MHz. Since this range is lower than the Rx frequency range, mixer 212 operates in "low side injection" mode and outputs an IF1 signal having a frequency $f_{IF1}=f_{Rx}-f_{LO1}$.

Typically, only one of LNAs 204 and 210, and one of mixers 206 and 212 is active, depending on whether receiver 200 is in GSM or a DCS mode. Oscillator LO1 will have a mode switch or other switching means that switches the oscillator between its low frequency range (GSM) and high frequency range (DCS). The handset processor usually provides the control signal to effect the switching of the oscillator between frequency ranges.

Once the Rx signal has been translated to the IF1 frequency (400 MHz), the IF1 signal is supplied to another filter 216. Filter 216 is preferably a bandpass filter that passes only signals within the Rx channel, and rejects all other signal components. The filtered IF1 signal is supplied to mixer 218. A second local oscillator LO2 oscillates at a fixed frequency $f_{LO2}$ of 770.8 MHz. Divider 222 divides the LO2 signal by two and supplies the divided LO2 signal (385.4 MHz) to the other port of mixer 218. Mixer 218 downconverts the IF1 signal to an IF2 signal having a frequency expressed as:

$$f_{IF2} = f_{IF1} - \frac{f_{LO2}}{2} = 400 - 385.4 = 14.6 \text{ MHz}.$$

In another alternative and common receiver architecture, rather than being downconverted to a second IF signal, the first IF signal is mixed with a 400 MHz signal (via a quadrature mixer) and converted down to baseband RxI and RxQ signals. This architecture is well known to those of ordinary skill in the art. The present invention may be employed in conjunction with either type of architecture.

The output signal from mixer 218 at frequency $f_{IF2}$ represents the output of receiver 200 and is supplied to an IF sampler for further processing. The output signal may also be subject to additional filtering, amplification and conversion to a digital signal.

Receiver 200 functions well in a conventional TDMA system having a frame structure such as frame 80 in FIG. 1a. Enough rest slots are present between traffic and monitor slots to permit oscillator LO1 to retune and settle to the required frequency.

Referring to frame 80, consider a scenario in which data is received in traffic slot three at a channel frequency of 935 MHz (GSM) and monitor slot six monitors a channel at a frequency of 1880 MHz (DCS). Such a scenario might occur if the handset is in a GSM/DCS fringe area, receiving data on a weak GSM traffic channel but monitoring a stronger channel in an adjacent DCS cell. In order to downconvert the Rx signal in traffic slot three down to the IF1 frequency of 400 MHz, LO1 must be tuned to a frequency of 1335 MHz. In order to downconvert the Rx signal in monitor slot six down to the IF1 frequency, LO1 must be tuned to a frequency of 1480 MHz. Hence, LO1 must be retuned from 1335 to 1480 MHz (a 145 MHz difference) and settled within two time slots. The retuning and settling process takes approximately 840 microseconds, which is no problem, since two rest slots having a duration of 577 microseconds each are available.

Figure 1B:
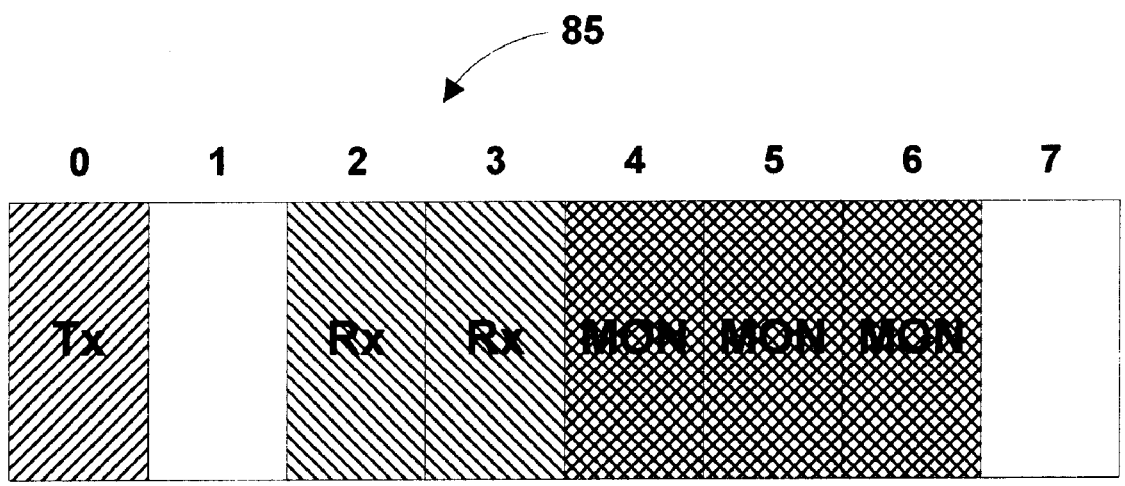
FIG. 1b illustrates the format of a multi-slot TDMA frame.

Consider, by contrast, a similar scenario in a TDMA system having multi-slot reception architecture. Referring to frame 85 of FIG. 1b, consider a receiver that receives data in traffic slots 2–3 on a 935 MHz (GSM) channel, and monitors in monitor slots 4–6 on an 1880 MHz (DCS) channel. Again, in order to downconvert the Rx signal in traffic slots 2–3 to the IF1 frequency, LO1 must be tuned to a frequency of 1335 MHz, and in order to downconvert the Rx signal in monitor slots 4–6, LO1 must be tuned to a frequency of 1480 MHz. Between slots 3 and 4, LO1 must be retuned from 1335 to 1480 MHz (a 145 MHz difference) and settled. Oscillator LO1 is not capable of retuning and settling virtually simultaneously, as is required for multi-slot reception of this type.

Figure 6:
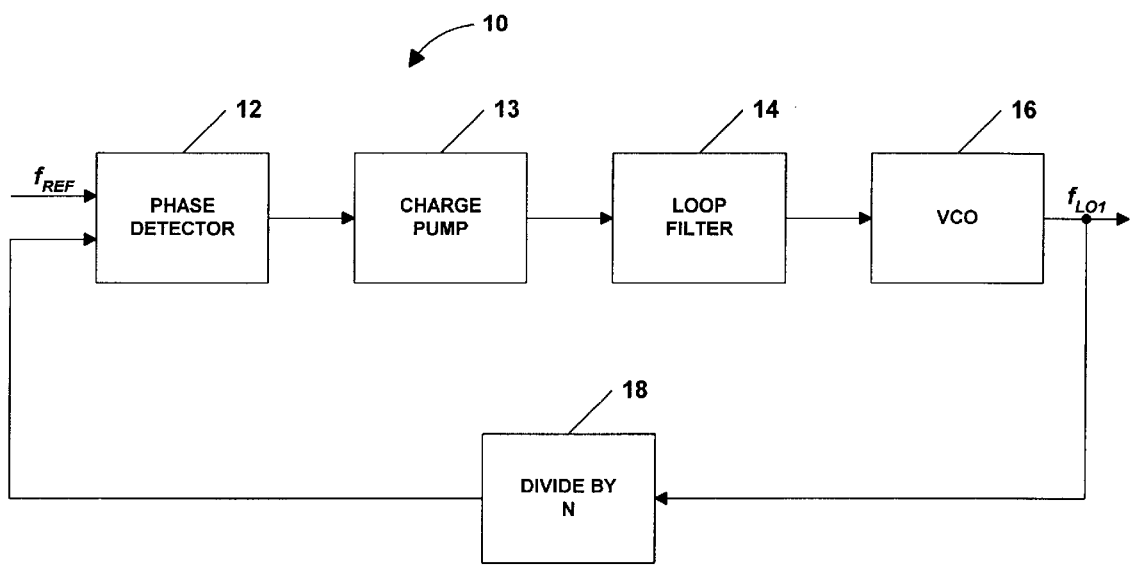
FIG. 6 is a block diagram of a conventional phase-locked loop.

Various attempts have been made to decrease the frequency channel switching time in order to accommodate multi-slot reception. One approach has been to reduce the locking time of the receiver's phase-locked loop. In an architecture such as receiver 200, the frequency of oscillator LO1 is controlled and settled by a phase-locked loop (PLL). The design and operation of PLLs is well known to those of ordinary skill in the art. A basic PLL 10 is depicted in FIG. 6.

PLL 10 includes a voltage-controlled oscillator (VCO) 16 that outputs a signal having a frequency $f_{LO1}$ within a predetermined frequency band (1325–1360 MHz for GSM; 1405–1480 MHz for DCS). PLL 10 also uses a reference or clock signal having a frequency $f_{REF}$ equal to the required step size or frequency resolution (e.g., the channel bandwidth) of the PLL. In GSM and DCS, the channel bandwidth is 200 kHz. Each step output of VCO 16 (e.g., 1330 MHz, 1330.2 MHz, 1330.4 MHz) is an exact integer N multiple of the reference frequency (e.g., 0.2 MHz).

Frequency divider 18 divides the frequency of the VCO output signal by an integer N to yield a signal having the same frequency as the reference frequency, $$f_{REF} = \frac{f_{LO1}}{N}.$$

The divided frequency and reference frequency signals are input to phase detector 12, which compares the phases of the two signals and outputs a control voltage to control the frequency of the VCO. The output from phase detector 12 is passed through a charge pump 13 and loop filter 14 before being supplied to VCO 16. The loop filter removes any spurious signals from the control voltage, and the control voltage steers the VCO to the proper frequency. Hence, the output frequency LO1 of VCO 16 can be programmed in discrete steps by changing the value of divider N.

The settling time of VCO 16 is largely determined by the corner frequency of the loop filter. The corner frequency is typically quite low (e.g., 10 kHz) in order to keep the noise and spurious within acceptable limits. One approach to decreasing the PLL lock time has been to increase the corner frequency of the loop filter. By increasing the corner frequency to 20–30 kHz or more, the size of the capacitors within the loop filter is decreased and the loop is able to move to a locked state (settled frequency) much quicker. The drawback of "pushing out" the corner frequency, of course, is that more phase noise from the reference is passed through the filter, and less rejection of spurious from the phase detector comparison frequency is achieved. This defeats the purpose of the loop filter, which is to keep the noise within the system spurious requirements.

Another approach to reducing frequency-switching times has been to employ a high reference frequency, that is, one that is much higher than the channel spacing. This, in turn, permits use of a higher loop filter corner frequency. This approach is implemented using fractional-N frequency synthesis. Fractional-N frequency synthesis is well known to those of ordinary skill in the art and involves the use of a PLL, such as PLL 10, having a fractional divider 18. A fractional division ratio permits use of a higher reference frequency while maintaining the required (200 kHz) channel spacing.

Fractional-N PLLs, however, have their limits. As the loop filter corner frequency is pushed out using fractionalized division values, an unacceptable amount of noise is passed through the loop filter. In addition, even with a fractional loop, the instantaneous switching times required by multi-slot reception architectures such as frame 85 cannot be achieved. Even extremely fast fractional-N PLLs can not achieve settle times below about 100 microseconds. Though fast, this is not fast enough where instantaneous switching is required. Use of fractional-N synthesis also adds significant cost to the receiver.

Another, somewhat more direct approach is to simply use two local oscillators to generate the first IF frequency. One oscillator would be programmed to the traffic channel frequency and the other programmed to the broadcast or monitor frequency. A switch could be employed to switch between the oscillators when necessary. This approach is unrealistic due to the unacceptably high costs of duplicating and placing another high frequency VCO on board.

4. Multi-Band Receiver having Enhanced Multi-Slot Capability

Figure 7:
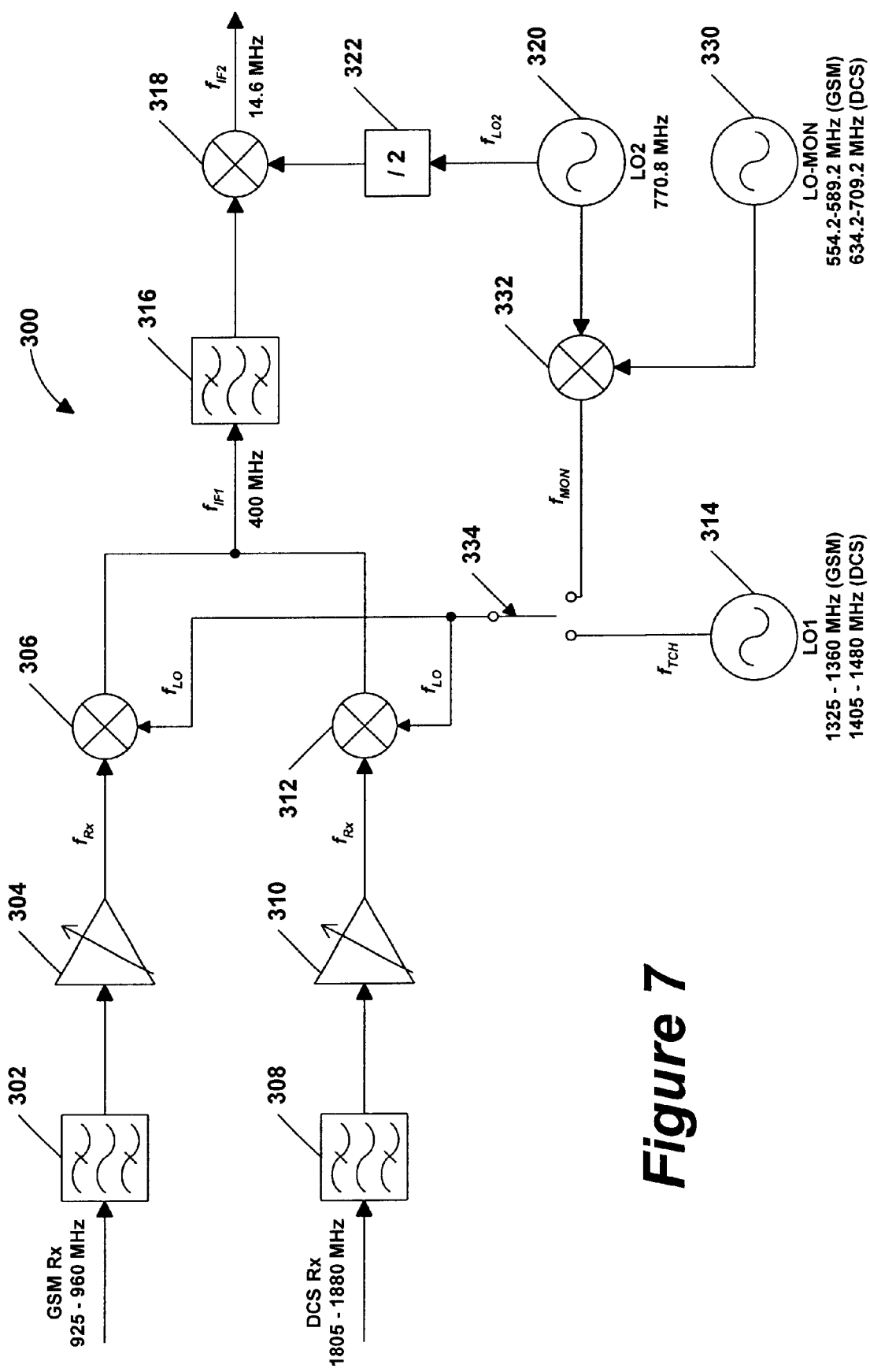
FIG. 7 is block diagram of a dual band multi-slot receiver according to the present invention.

A dual band receiver 300 according to the present invention is illustrated in FIG. 7. Receiver 300 provides multi-slot reception and monitoring capability with virtually instantaneous frequency switching, while avoiding the shortcomings of the various multi-slot approaches described above.

Receiver 300 receives Rx signals on a frequency channel $f_{Rx}$ from an antenna, such as antenna 116 of FIG. 4. The signals will be received in either a traffic slot or a monitor slot. Initially, the Rx signals are filtered to remove out-of-band components. In one implementation, receiver 300 has a dual band configuration. Filter 302 passes only signals within the GSM receive band (925–960 MHz), and filter 308 passes only signals within the DCS receive band (1805–1880 MHz). Low noise amplifiers (LNA) 304 and 310 amplify the Rx signals, which are typically received at a low level. Preferably, LNAs 304 and 310 have a low noise figure to prevent addition of excessive noise to weak Rx signals, and a high intercept point to prevent strong interfering signals from causing interference to the Rx signals.

The filtered and amplified Rx signal output by one of LNAs 304 and 310 is supplied to its associated mixer 306 or 312. Mixer 306 or 312 combines the Rx signal with an LO signal from switch 334 to produce an IF1 output signal at a first IF frequency ($f_{IF1}$). In one implementation, when receiver 300 is tuned to a traffic channel, the LO signal supplied by switch 334 originates from oscillator LO1 and has a frequency $f_{TCH}$. When receiver 300 is in a monitor slot, the LO signal supplied by switch 334 originates from mixer 332 and has a frequency $f_{MON}$. Again, the LO signal frequency $f_{LO}$ is separated from the Rx signal frequency $f_{Rx}$ by the IF1 signal frequency $f_{IF1}$ (400 MHz)

Oscillator LO1 is analogous to oscillator LO1 of receiver 200. When receiver 300 is in a traffic slot, switch 334 is connected to oscillator LO1. For GSM, the frequency range (bandwidth) of oscillator LO1 is 1325–1380 MHz. Since this range is higher than the Rx signal frequency range, mixer 306 operates in "high side injection" mode and mixes the Rx signal with the LO signal from oscillator LO1 to produce an IF1 signal having a frequency $f_{IF1}=f_{TCH}-f_{Rx}$. For DCS, the frequency range of oscillator LO1 is 1405–1480 MHz. Since this range is lower than the Rx frequency range, mixer 312 operates in "low side injection" mode and mixes the Rx signal with the LO signal from oscillator LO1 to produce an IF1 signal having a frequency $f_{IF1}=f_{Rx}-f_{TCH}$. Again, only one of LNAs 304 and 310, and one of mixers 306 and 312 is active, depending on whether receiver 300 is receiving a GSM or a DCS signal.

When receiver 300 moves from a traffic slot to a monitor slot, switch 334 connects to mixer 332, which outputs an LO signal having a frequency $f_{MON}$. Receiver 300 takes advantage of the presence of fixed low frequency oscillator LO2 (analogous to oscillator LO2 of receiver 200) by providing another inexpensive, variable low frequency oscillator LO-MON. The signals from low frequency oscillators LO2 and LO-MON are mixed and upconverted by mixer 332 to provide the necessary LO signal to switch 334 and mixers 306, 312. LO-MON is preprogrammed at an appropriate frequency such that when its output signal is mixed with the output signal from LO2, which has a fixed frequency of 770.8 MHz, the required LO signal is produced. Hence, when instantaneous frequency switching is necessary, as in the transition between traffic slot three and monitor slot four in frame 85 of FIG. 1b, receiver 300 provides an instantaneous frequency switch via switch 334.

When receiver 300 needs to monitor a broadcast or other frequency channel, then, switch 334 is connected to the signal from mixer 332 having a frequency $f_{MON}$. For GSM, the frequency range of oscillator LO-MON is 554.2–589.2 MHz, and for DCS, the frequency range is 634.2–709.2 MHz. Mixer 332 mixes the signals from oscillators LO2 and LO-MON to produce an upconverted LO signal at the required frequency $f_{MON}$. Depending on whether receiver 300 is in GSM or DCS mode, $f_{MON}$ is in the range of either 1325–1380 MHz or 1405–1480 MHz ($f_{MON}=f_{LO-MON}+770.8$ MHz). Mixer 306 or 312, depending on the mode, receives the LO signal from switch 334 and mixes it with the Rx signal to produce an IF1 signal as described above.

Once the Rx signal has been translated to the IF1 frequency (400 MHz), the IF1 signal is supplied to another filter 316. In one implementation, filter 316 is a bandpass filter that passes only signals within the Rx frequency channel, and rejects all other components. The filtered IF1 signal is supplied to mixer 318. Oscillator LO2, which is also used to generate the IF downconversion signal, oscillates at a fixed frequency of 770.8 MHz. Divider 322 divides the LO2 signal by two and supplies the divided LO2 signal (385.4 MHz) to the other port of mixer 318. Mixer 318 downconverts the IF1 signal to an IF2 signal having a frequency expressed as:

In another alternative and common receiver architecture, rather than being downconverted to a second IF signal, the first IF signal is mixed with a 400 MHz signal (via a quadrature mixer) and converted down to baseband RxI and RxQ signals. This architecture is well known to those of ordinary skill in the art. The present invention may be employed in conjunction with either type of architecture.

The output signal from mixer 318 at frequency $f_{IF2}$ represents the output of receiver 300 and is supplied to an IF sampler for further processing. The output signal may also be subject to additional filtering, amplification and conversion to a digital signal.

Receiver 300 provides virtually instantaneous frequency switching to permit multi-slot reception by taking advantage of a pre-existing oscillation resource (oscillator LO2) and adding another low frequency oscillator (LO-MON). The added oscillator is inexpensive and adds a current drain of only a few milliamps. The added mixer 332 is also another inexpensive element; it can essentially be implemented as a transistor and adds a current drain of only 2–3 milliamps. Mixing oscillator LO-MON with the preexisting oscillator LO2 essentially duplicates high frequency oscillator LO1, but without the added expense and current drain of an added high frequency oscillator. Moreover, a low frequency oscillator and mixer can be integrated into the pre-existing components on one IC.

The frequency switching provided by switch 334 is virtually instantaneous—it takes place in a matter of microseconds. In the context of inventive receiver 300, consider the previous example where slots 2–3 are traffic slots receiving data on a 935 MHz GSM channel, and monitor slots 4–6 monitor an 1880 MHz DCS channel. LO1 is again tuned to a frequency of 1335 MHz in order to downconvert the Rx signal in slots 2–3 to the IF1 frequency of 400 MHz. LO-MON is tuned to a frequency of 709.2 MHz and mixed with the fixed frequency signal from LO2 (770.8 MHz) to produce a signal at mixer 332 having a frequency 1480 MHz. Between traffic slot 3 and monitor slot 4, switch 334 simply switches from LO1 to mixer 332 to provide instantaneous frequency switching. Switch 334 is most preferably implemented as an inexpensive pin diode, but could also be implemented as a flat switch or as any other appropriate switching mechanism.

Figure 8:
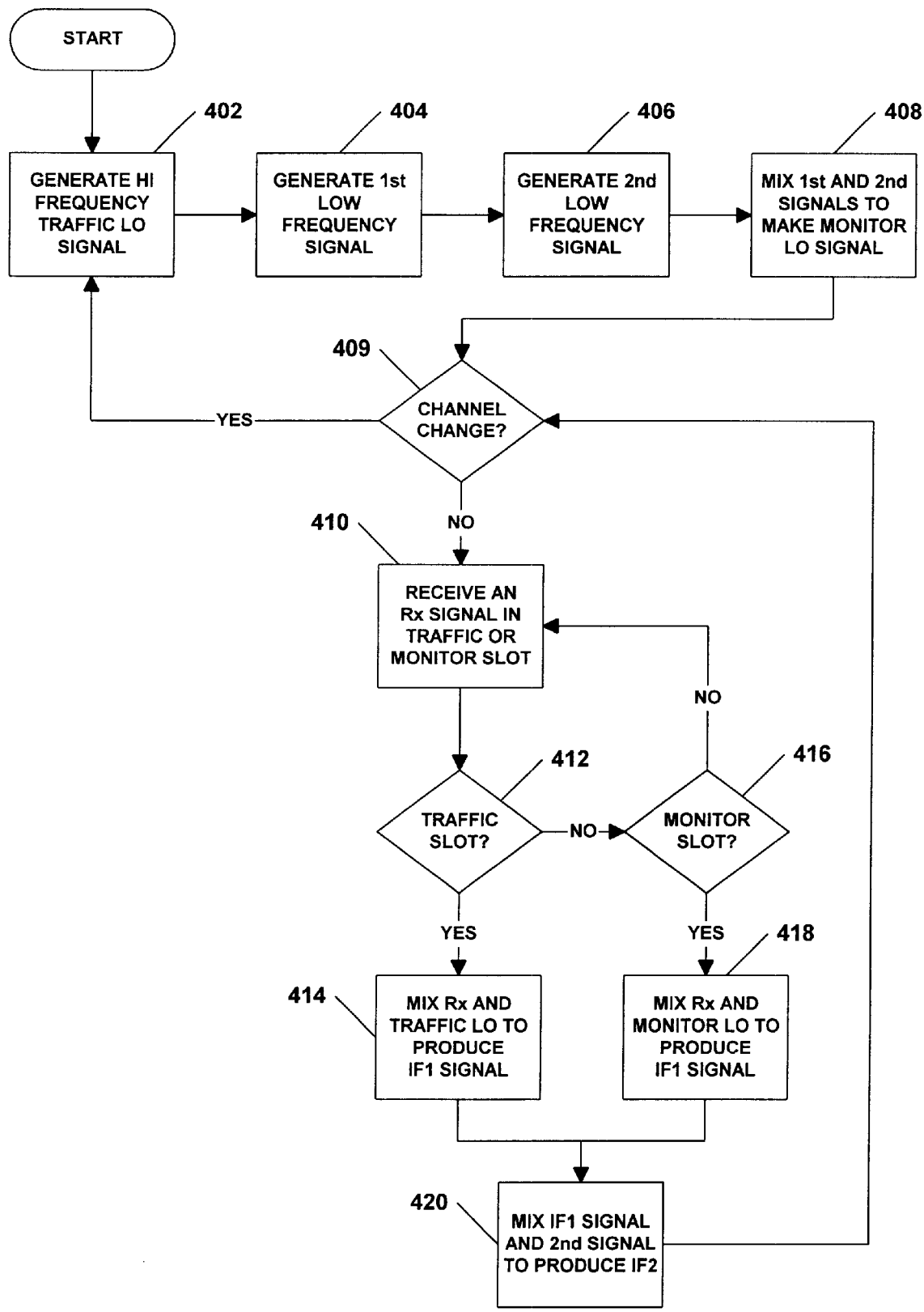
FIG. 8 is a flowchart illustrating a method of receiving a signal according to the present invention.

A method for receiving a signal according to the present invention is illustrated in FIG. 8. In steps 402–408, the necessary oscillation signals are generated. Generation of these signals is ongoing, and may be performed in any order. In step 402, a relatively high frequency traffic LO signal is generated. The traffic LO signal is in a frequency range of 1325–1380 MHz for GSM, or a frequency range of 1405–1480 MHz for DCS.

In step 404, a first relatively low frequency signal is generated. The first low frequency signal is in a range of 554.2–589.2 MHz (GSM) or 634.2–709.2 MHz (DCS). A second relatively low frequency signal is generated in step 406. In one implementation, it is a fixed frequency signal of 770.8 MHz. In step 408, the first and second relatively low frequency signals are mixed to produce a relatively high frequency monitor LO signal. The frequency range of the monitor LO signal generated in step 408 is the same as that of the traffic LO signal produced in step 402.

At decision node 409, if either the traffic or monitor channel frequency is going to change, the process returns to step 402 to generate appropriate new signals. If the channels are unchanged, the method continues to step 410. An Rx signal is received in either a traffic slot or a monitor slot. If the received signal is in a traffic slot (step 412), the traffic LO and Rx signals are mixed to produce an IF1 signal (step 414). In one implementation, the IF1 frequency is 400 MHz. If the received signal is in a monitor slot (step 416), the monitor LO and Rx signals are mixed to produce the IF1 signal (step 418). If the receiver is in neither a traffic nor a monitor slot, the receiver is in a rest slot and the method loops back to step 410 to await entry into either a traffic or monitor slot.

In step 420, the IF1 and second low frequency signals are mixed to produce the output signal of the receiver. In one implementation, the output signal is a second IF signal at an IF2 frequency of 14.6 MHz. In another implementation, baseband RxI and RxQ signals are produced.

While particular embodiments of the present invention have been described above, it should be understood that they have been presented by way of example only, and not as limitations. The breadth and scope of the present invention is defined by the following claims and their equivalents, and is not limited by the particular embodiments described herein.

What is claimed is:

1. A method for wireless, multi-slot reception comprising the following steps:

generating a relatively high frequency traffic LO signal;

generating a first relatively low frequency signal;

generating a second relatively low frequency signal;

mixing the first and second relatively low frequency signals to generate a relatively high frequency monitor LO signal;

receiving an Rx signal in a traffic slot or a monitor slot of a TDMA frame;

mixing the Rx signal with the traffic LO signal if the Rx signal is received in the traffic slot to generate a first IF signal;

mixing the Rx signal with the monitor LO signal if the Rx signal is received in the monitor slot to generate the first IF signal; and mixing the first IF signal with the one of the low frequency signals to generate an output signal.

2. A method as claimed in claim 1, wherein the first low frequency signal is generated in a 554.2–589.2 MHz bandwidth for GSM operation and in a 634.2–709.2 MHz bandwidth for DCS operation, and wherein the second low frequency signal has a fixed frequency of 770.8 MHz.

3. A method as claimed in claim 2, wherein the first IF signal is mixed with the second low frequency signal to generate the output signal.

4. A method as claimed in claim 1, wherein the traffic LO signal is generated in a 1325–1380 MHz bandwidth for GSM operation and in a 1405–1480 MHz bandwidth for DCS operation.

5. A method as claimed in claim 1, wherein the Rx signal is received in a 925–960 MHz bandwidth for GSM operation and in an 1805–1880 MHz bandwidth for DCS operation.

6. A wireless communication device comprising:

a microphone for capturing audio acoustic signals and converting the acoustic signals into electric signals;

a speaker for converting electric signals into audio acoustic signals;

an antenna for wireless transmission and reception of acoustic or data signals;

a transmitter for transmitting acoustic or data signals over the antenna;

a receiver comprising a high frequency oscillator that generates a traffic signal; two low frequency oscillators; a first mixer that mixes the signals from the two low frequency oscillators to generate a monitor signal; a switch that selects either the monitor or traffic signal; a second mixer that mixes a received signal from the antenna with either the traffic or monitor signal from the switch to generate an IF signal; and a third mixer that mixes the IF signal with a signal from one of the low frequency oscillators to generate an output signal; and a processor for directing operation of the communication device.

7. A wireless communication device as claimed in claim 6, wherein one of the low frequency oscillators has a variable frequency range and the other of the low frequency oscillators has a fixed frequency.

8. A receiver comprising:

an antenna that receives an Rx signal a first oscillator that generates a relatively high frequency traffic LO signal;

a second oscillator that generates a first relatively low frequency signal;

a third oscillator that generates a second relatively low frequency signal;

a first mixer that mixes the first and second relatively low frequency signals to produce a relatively high frequency monitor LO signal;

a second mixer that mixes either the traffic or monitor LO signal with the Rx signal to produce a first IF signal; and a third mixer that mixes the first IF signal and the second relatively low frequency signal to produce an output signal.

9. A receiver as claimed in claim 8, wherein the first relatively low frequency signal has a frequency in a range of 554.2–589.2 MHz for GSM operation or 634.2–709.2 MHz for DCS operation.

10. A receiver as claimed in claim 8, wherein the traffic LO signal has a frequency in a range of 1325–1380 MHz for GSM operation or 1405–1480 MHz for DCS operation.

11. A receiver as claimed in claim 8, wherein the second mixer operates in high-side injection mode for GSM operation and in low-side injection mode for DCS operation.

12. A receiver as claimed in claim 8, wherein the Rx signal has a frequency in a range of 925–960 MHz for GSM operation or 1805–1880 MHz for DCS operation.

13. A receiver as claimed in claim 8, wherein the second relatively low frequency signal has a fixed frequency of 770.8 MHz.

14. A receiver as claimed in claim 1, and further comprising a switch for switching between the traffic and monitor LO signals.

15. A receiver as claimed in claim 14, wherein the switch comprises a pin diode.

16. A receiver as claimed in claim 8, wherein the first mixer performs an upconversion to produce the monitor LO signal.

17. A receiver as claimed in claim 8, wherein the output signal is a second IF signal having a frequency of 14.6 MHz.

18. A receiver as claimed in claim 8, wherein the first IF signal has a frequency of 400 MHz.

* * * * *